United States Patent
Azulai et al.

(10) Patent No.: US 12,260,659 B2
(45) Date of Patent: Mar. 25, 2025

(54) FONT ATTRIBUTE DETECTION

(71) Applicant: INTERNATIONAL BUSINESS MACHINES CORPORATION, Armonk, NY (US)

(72) Inventors: Ophir Azulai, Tivon (IL); Daniel Nechemia Rotman, Haifa (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 17/660,639

(22) Filed: Apr. 26, 2022

(65) Prior Publication Data

US 2023/0343124 A1    Oct. 26, 2023

(51) Int. Cl.
| | | |
|---|---|---|
| G06F 40/30 | (2020.01) | |
| G06V 30/14 | (2022.01) | |
| G06V 30/148 | (2022.01) | |
| G06V 30/244 | (2022.01) | |

(52) U.S. Cl.
CPC ............ *G06V 30/245* (2022.01); *G06F 40/30* (2020.01); *G06V 30/1444* (2022.01); *G06V 30/153* (2022.01)

(58) Field of Classification Search
CPC ............ G06V 30/245; G06V 30/1444; G06V 30/153; G06V 30/158; G06V 30/166; G06V 30/226; G06V 30/1475; G06F 40/30
USPC ......................................................... 382/229
See application file for complete search history.

(56) References Cited

U.S. PATENT DOCUMENTS

| | | | |
|---|---|---|---|
| 5,668,891 A | 9/1997 | Fan | |
| 10,984,295 B2 | 4/2021 | Wang | |
| 11,481,679 B2 * | 10/2022 | Venkataraman Ganesh | ................ G06N 20/00 |
| 2020/0160050 A1 * | 5/2020 | Bhotika | ............... G06V 30/414 |

FOREIGN PATENT DOCUMENTS

TW            480457 B        3/2002

OTHER PUBLICATIONS

GitHub; "Vasile-Peste/Typefont", Downloaded Feb. 17, 22, 8 PGS. <https://github.com/Vasile-Peste/Typefont>.
GitHub_Hwalsuklee;, "Awesome-Deep-Text-Detection-Recognition", Downloaded Feb. 17, 2022, 29 Pgs. <https://github.com/hwalsuklee/awesome-deep-text-detection-recognition>.
GitHub_Kovart; "Font-classificator", Downloaded Feb. 17, 2022, 4 PGS, <https://github.com/kovart/font-classificator>.

(Continued)

*Primary Examiner* — Charlotte M Baker
(74) *Attorney, Agent, or Firm* — Stosch Sabo

(57) ABSTRACT

Described are techniques for font attribute detection. The techniques include receiving a document having different font attributes amongst a plurality of words respectively comprised of at least one character. The techniques further include generating a dense image document from the document by setting the plurality of words to a predefined size, removing blank spaces from the document, and altering an order of characters relative to the document. The techniques further include determining characteristics of the characters in the dense image document and aggregating the characteristics for at least one word. The techniques further include annotating the at least one word with a font attribute based on the aggregated characteristics.

20 Claims, 8 Drawing Sheets

(56) References Cited

OTHER PUBLICATIONS

GitHub_MGN0015095; "Font Recognition-Project", Downloaded Feb. 17, 2022, 3 PGS, <https://github.com/MGN00150905/Font-Recognition-Project>.

GitHub_Sandeshhegda9; "Font-Style-recognition-Using-Neural_Networks", Downloaded Feb. 17, 2022, 2 PGS, <https://github.com/sandeshhegde9/Font-Style-Recognition-using-Neural-Networks.

Mell et al., "The NIST Definition of Cloud Computing", National Institute of Standards and Technology, Special Publication 800-145, Sep. 2011, 7 pages.

Saikrishna et al., "Script Independent Detection of Bold Words in Multi Font-size Documents", 4 Pgs., Downloaded Feb. 10, 2022.

Tesseract: FontInfo Struct Reference, "3 API for font style", Downloaded Feb. 10, 2022, 5 PGS, <https://tesseract-ocr.github.io/tessapi/3.x/a00399 . . . >.

Zramdini et al., "ApOFIS: an A priori Optical Font Identification System", Institute of Informatics, University of Fribourg, 6 Pgs, Published 1995, Downloaded Feb. 10, 2022, <https://dblp.org/rec/conf/iciap/Zramdinil95.html>.

Ami Mehta et al. "Multifont Multisize Gujarati OCR with Style Identification" 2017 IEEE 7 pages.

Goncalves et al. "Real-time automatice License Plate Recognition Through Deep Multitask Networks" 2018 IEEE, pp. 110-117.

J. Dholakia et al "Zone Identification in the Printed Gujarati Text" IEEE 2005 5 pages.

Radwan et al. "Neural Networks Pipeline for Offline Machine Printed Arabic OCR" Springer Science & Business Media LLC Oct. 27, 2017 19 pages.

Sandu et al. "Context Sensitive Transformer for Bold Worlds Classification" arxiv 2205.07683V1 May 16, 2022, 5 pages.

International Search Report and Written Opinion for Application PCT/IB2023/052851, Jun. 12, 2023, 14 pages.

\* cited by examiner

400

402
SET THE PLURALITY OF WORDS TO A PREDEFINED SIZE

404
REMOVE BLANK SPACES FROM THE DOCUMENT

406
ALTER AN ORDER OF CHARACTERS IN THE DENSE IMAGE DOCUMENT RELATIVE TO THE RECEIVED DOCUMENT

412
GENERATE SYNTHETIC DENSE IMAGE DOCUMENTS

414
TRAIN THE SEMANTIC SEGMENTATION MODEL ON THE SYNTHETIC DENSE IMAGE DOCUMENTS

416
INPUT THE DENSE IMAGE DOCUMENT INTO THE SEMANTIC SEGMENTATION MODEL

418
RECEIVE CHARACTERISTICS OF THE CHARACTERS IN THE DENSE IMAGE DOCUMENT AS OUTPUT FROM THE SEMANTIC SEGMENTATION MODEL

FIG. 4B

FONT ATTRIBUTE DETECTION

BACKGROUND

The present disclosure relates to Optical Character Recognition (OCR), and, more specifically, to font style detection.

OCR can refer to electronic conversion of text (e.g., typed, handwritten, printed, etc.) into machine-encoded text. OCR can generate machine-encoded text from a scanned document, a photograph of a document, a photograph including text (e.g., a photograph of a storefront sign including text), and the like. OCR can utilize techniques from the fields of pattern recognition, artificial intelligence, computer vision, and others to electronically convert text to machine-encoded text.

OCR can be useful for digitizing printed text in order to electronically edit, search, store, and/or display the digitized printed text. Furthermore, after OCR, the digitized printed text can be used in other machine processes such as, but not limited to, Natural Language Processing (NLP) tasks (e.g., machine translation, text-to-speech conversion, text mining, etc.).

SUMMARY

Aspects of the present disclosure are directed toward a computer-implemented method comprising receiving a document having different font attributes amongst a plurality of words respectively comprised of at least one character. The method further comprises generating a dense image document from the document by setting the plurality of words to a predefined size, removing blank spaces from the document, and altering an order of characters relative to the document. The method further comprises determining characteristics of the characters in the dense image document. The method further comprises aggregating the characteristics for at least one word. The method further comprises annotating the at least one word with a font attribute based on the aggregated characteristics.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 4A illustrates a flowchart of an example method for generating a dense image document corresponding to a received document, in accordance with some embodiments of the present disclosure.

FIG. 4B illustrates a flowchart of an example method for training a semantic segmentation model, in accordance with some embodiments of the present disclosure.

Figure 1:
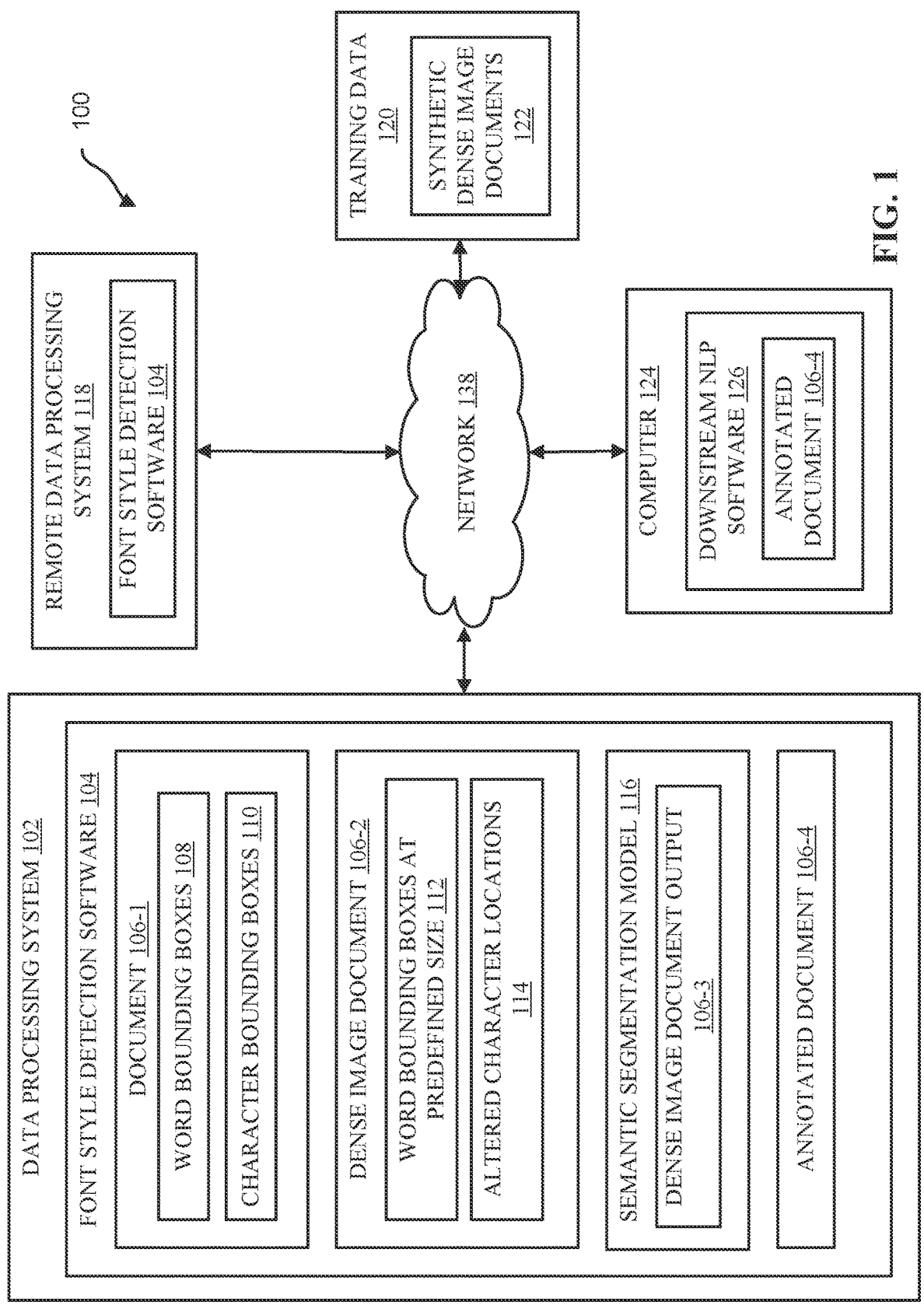
FIG. 1 illustrates a block diagram of an example computational environment implementing font style detection software, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward Optical Character Recognition (OCR), and, more specifically, to font style detection. While not limited to such applications, embodiments of the present disclosure may be better understood in light of the aforementioned context.

Detecting font styles (e.g., bold, italic, underline, etc.) is an important aspect of OCR. For example, different font styles add meaning to a document, such as by emphasizing, summarizing, differentiating, separating, or otherwise conveying meaning to text that is not explicitly conveyed by words. However, detecting different font styles can be difficult due to variations between fonts, languages, and the like. For example, a first font can have thicker lettering and a second font can have thinner lettering. Without an understanding of the font, some OCR technologies might mischaracterize emboldened text in the second font as not bold, insofar as the thinner lettering of the second font, even when emboldened, may still be thinner than the normal text of the thicker, first font. Similar mischaracterizations can occur for other font attributes (e.g., italic, underlined) for different fonts, styles, and/or languages of text.

Advantageously, aspects of the present disclosure overcome these challenges by detecting font styles using document-level context. More specifically, aspects of the present disclosure can generate a dense image document from a received document, where the dense image document is generated by one or more of: (i) normalizing text in the received document to a similar size; (ii) removing blank spaces from the received document; and/or (iii) altering positions of at least some characters relative to their positions in the received document. Aspects of the present disclosure can then analyze the dense image document to differentiate various font attributes of various words in the original document based on differences between characters in the dense image document.

Advantageously, aspects of the present disclosure increase accuracy of font style detection in OCR applications. For example, by normalizing all text to a same size, aspects of the present disclosure remove erroneous font style classifications resulting from different sizes of text (e.g., a larger, heading text size compared to a smaller, body text size).

As another example advantage, by removing blank spaces from the received document, aspects of the present disclosure can reduce erroneous font style classifications resulting from blank spaces in the text altering measured characteristics of the text. For example, a bold word "a" with a space on either side of it may be mischaracterized as not bold insofar as the space on either side of the word can influence a font attribute metric (e.g., a ratio of pixels to whitespace) for the word (where such a font attribute metric would be less influenced by the blank space on either side of a multi-letter word). Similar font attribute misclassifications can be generated by line breaks, tabs, tables, graphics, captions, and/or other features of a received document that can have irregular spacing relative to other portions of the received document.

As yet another example advantage, font style detection accuracy is increased by altering positions of at least a portion of the characters in the dense image document relative to the received document. Similar to the errors introduced by blanks spaces described above, font style classification errors can also be introduced by font styles of adjacent characters. For example, consecutive bold characters in a middle of a word can have a different font attribute metric relative to bold characters at the beginning and ending of a bold word insofar as the presence or absence of adjacent characters with a similar font style can skew font attribute metrics (e.g., a ratio of pixels to whitespace). Altering positions of the characters can normalize such effects. For example, since certain font styles (e.g., bold, italic, underline) are typically a minority of characters in a received document, by altering a position of respective characters in the document it can increase the likelihood that characters with a given font style are adjacent to characters without the given font style.

Referring now to the figures, FIG. 1 illustrates a block diagram of an example computational environment 100 implementing font style detection software 104, in accordance with some embodiments of the present disclosure. The computational environment 100 includes a data processing system 102, remote data processing system 118, computer 124, and training data 120 communicatively coupled to one another via a network 138. The network 138 can be a local area network (LAN), a wide area network (WAN), an intranet, the Internet, or any other network 138 or group of networks 138 capable of continuously, semi-continuously, or intermittently connecting (directly or indirectly) the aforementioned components together.

Font style detection software 104 can be executed on the data processing system 102. In some embodiments, the font style detection software 104 is downloaded to the data processing system 102 from a remote data processing system 118. In other embodiments, some aspects of the font style detection software 104 are implemented by the data processing system 102 and other aspects of the font style detection software 104 are implemented by the remote data processing system 118.

The font style detection software 104 can receive a document 106-1. The received document 106-1 can be any image including text, where the text can include different font attributes (e.g., at least a portion of the text emboldened, italicized, and/or underlined). The font style detection software 104 can generate word bounding boxes 108 segmenting individual words from a plurality of words in the document 106-1. The font style detection software 104 can further generate character bounding boxes 110 segmenting individual characters within words defined by the word bounding boxes 108.

The font style detection software 104 can generate a dense image document 106-2 based on the received document 106-1. The dense image document 106-2 can (i) set all text to a same size; (ii) remove whitespace from the received document 106-1 (e.g., spaces between adjacent words, empty line breaks, blank pages, etc.), and/or (iii) alter locations of characters compared to character locations in the received document 106-1. Collectively, the dense image document 106-2 can be a matrix, tensor, database, or other data array that is filled with characters defined by the character bounding boxes 110, excluding white spaces, and in a different order than an order of the characters in the document 106-1.

More specifically, the dense image document 106-2 can normalize a size of the text in the document 106-1 by transforming word bounding boxes 108 to word bounding boxes at predefined size 112. The word bounding boxes at predefined size 112 can cause all text in the document 106-1 to be a same or similar font size. In some embodiments, the word bounding boxes at predefined size 112 are generated by setting the word bounding boxes 108 to a predefined height while maintaining the original aspect ratio (e.g., ratio of width to height) of the word bounding boxes 108. Dense image document 106-2 can further generate altered character locations 114. Altered character locations 114 can place characters from the character bounding boxes 110 in different locations relative to the locations of those character bounding boxes 110 in the document 106-1. In this way, the altered character locations 114 can normalize font attribute metrics that may be otherwise skewed by adjacent characters with similar, minority font style attributes. Character locations can be altered randomly, semi-randomly, or according to an algorithm (e.g., an algorithm utilizing modulos, exponents, logarithmic functions or other mathematical functions useful for rearranging characters in a seemingly random order). Regardless of how the character locations are altered, aspects of the present disclosure can maintain a correspondence between respective altered character locations 114 and corresponding character bounding boxes 110 such that font attribute metrics for characters the altered character locations 114 can be aggregated, combined, or otherwise reconstituted with the original word the character belongs to in the received document 106-1.

Although not explicitly shown, the dense image document 106-2 can also remove blank spaces from the document 106-1. Removing blank spaces may involve removing spaces separating words (e.g., spaces between adjacent word bounding boxes 108), removing empty lines, and/or removing other empty, non-text spaces in the document 106-1. Removing blank spaces can normalize any effect extra whitespace may have on font attribute metrics, thereby improving accuracy of detected font attributes. Blank spaced can be removed by virtue of using word bounding boxes 108 and character bounding boxes 110 which can be configured to exclude blank spaces.

The font style detection software 104 can input the dense image document 106-2 to a semantic segmentation model 116. The semantic segmentation model 116 can be any mathematical model now known or later developed. The semantic segmentation model 116 can perform simple algorithms on the dense image document (e.g., calculating a ratio of pixels to whitespace for respective characters in the dense image document 106-2) or performing more complex mathematical operations on the dense image document 106-2 using machine learning, Artificial Intelligence (AI), and/or other cognitive computing techniques. In embodiments where the semantic segmentation model 116 requires training, the semantic segmentation model 116 can be trained using training data 120 comprised of synthetic dense image documents 122. The synthetic dense image documents 122 can be based on a corpus of documents that are converted into synthetic dense image documents 122 in the same manner that dense image document 106-2 is generated from the received document 106-1.

Referring back to the semantic segmentation model 116, it can utilize any number of rules, algorithms, and/or techniques for generating dense image document output 106-3. In some embodiments, the semantic segmentation model 116 can include any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, semantic segmentation model 116 can be configured to perform machine learning on the synthetic dense image documents 122 using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training the semantic segmentation model 116, the semantic segmentation model 116 can ingest dense image document 106-2 and output dense image document output 106-3.

In some embodiments, the dense image document output 106-3 is a score (e.g., between 0 and 1 inclusive) corresponding to each character in the dense image document 106-2 and representing a probability of each character having a certain font attribute (e.g., bold, italic, underline, etc.). In other embodiments, the dense image document output 106-3 is a score (e.g., between 0 and 1 inclusive) corresponding to each character in the dense image document 106-2 and representing a ratio of pixels divided by whitespace (or pixels divided by total area) of each character, where certain ratios or ranges of ratios can indicate certain font attributes (e.g., bold, italic, underline, etc.).

The font style detection software 104 can utilize the dense image document output 106-3 to generate annotated document 106-4, where the annotated document 106-4 includes information related to font attributes for various words of the received document 106-1. In some embodiments, generating the annotated document 106-4 involves aggregating outputs from dense image document output 106-3 for respective words in the received document 106-1, where respective aggregated outputs can be used to indicate a font attribute for respective words (e.g., no attribute, bold, italic, underline, etc.).

The annotated document 106-4 can be provided to downstream NLP software 126 executing on a computer 124. The downstream NLP software 126 can perform downstream NLP tasks such as, for example, question-answer, semantic search, classification, summarization, and the like. Such downstream NLP tasks can be improved by the annotated document 106-4 insofar as the annotated document 106-4 includes accurately identified font attributes which can provide additional meaning and/or context for the downstream NLP tasks.

The data processing system 102, the remote data processing system 118, and the computer 124 can be any computer, server, mainframe, virtual machine (VM), tablet, notebook, smartphone, other computer hardware, multiples of the aforementioned, and/or combinations of the aforementioned. Although not explicitly shown, training data 120 can be stored in one or multiple data storage systems. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Figures 2A, 2B:
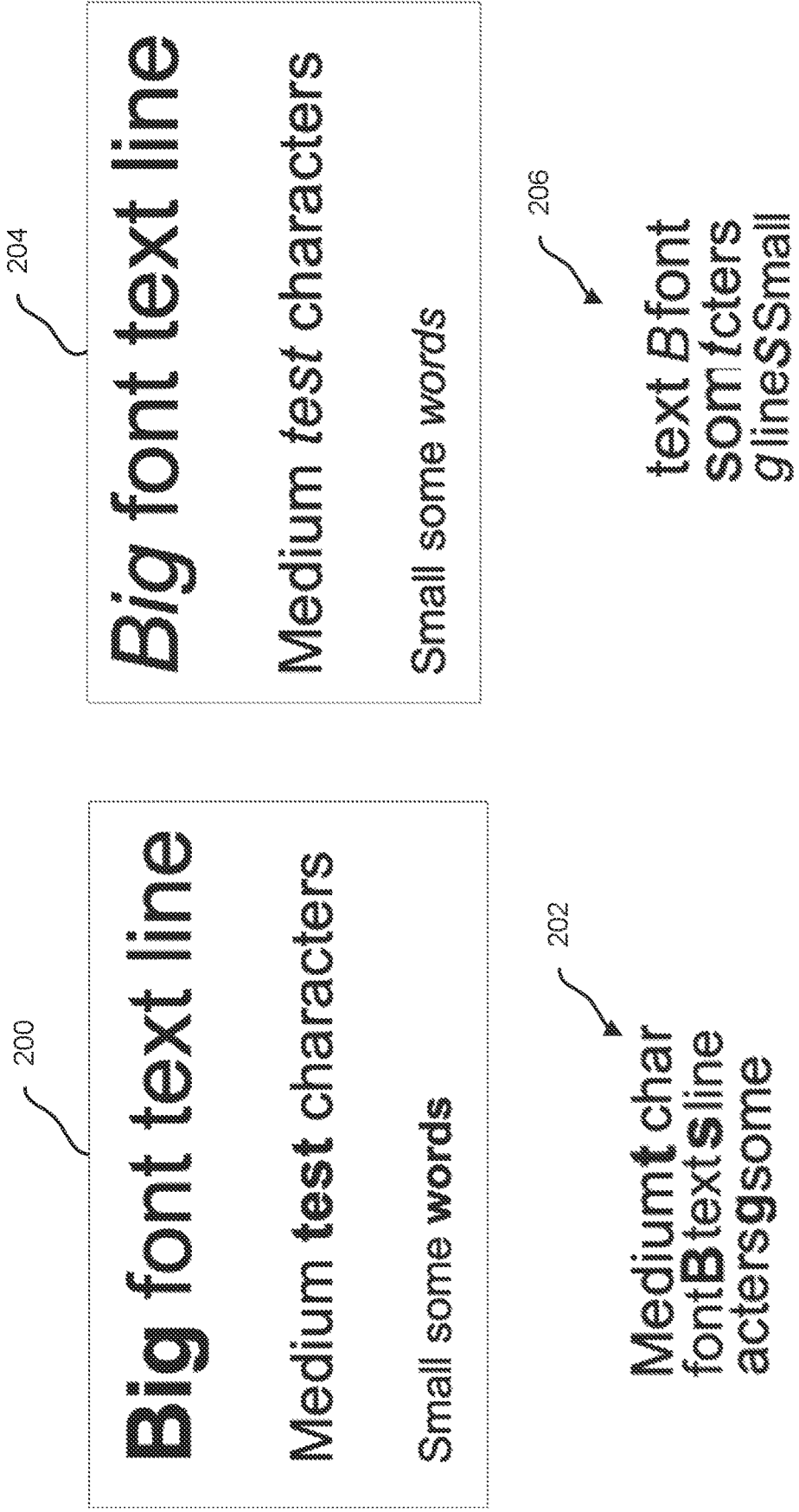
FIG. 2A illustrates an example document and corresponding dense image document with a font style including emboldened text, in accordance with some embodiments of the present disclosure.
FIG. 2B illustrates an example document and corresponding dense image document with a font style including italicized text, in accordance with some embodiments of the present disclosure.

FIG. 2A illustrates an example document 200 and corresponding dense image document 202 with a font style including emboldened text, in accordance with some embodiments of the present disclosure. In some embodiments, the document 200 and the dense image document 202 can be consistent with document 106-1 and the dense image document 106-2 of FIG. 1, respectively. As shown in FIG. 2A, the document 200 includes a plurality of words, each word including at least one character (e.g., letter). The plurality of words includes words in different sizes (e.g., the top line is larger in size than the middle line, and the middle line is larger in size than the bottom line). Furthermore, some of the plurality of words include a font attribute, namely bold. Aspects of the present disclosure can convert the document 200 to the dense image document 202 in order to more accurately identify font attributes. Aspects of the present disclosure can transform the document 200 into the dense image document 202 by: (i) setting all characters to a similar size; (ii) removing blank spaces; and/or (iii) altering locations of individual characters in the dense image document 202 relative to the document 200. It should be noted that the dense image document 202 is only a portion of a dense image document based on the document 200 insofar as not all characters in the document 200 are explicitly illustrated in the dense image document 202. Furthermore, the altered locations of characters in the dense image document 202 are purely exemplary, and in other embodiments, different order alteration schemes can be used to alter the locations of the characters more significantly, less significantly, or differently than the alterations shown in the dense image document 202.

FIG. 2B illustrates an example document 204 and corresponding dense image document 206 with a font style including italicized text, in accordance with some embodiments of the present disclosure. In some embodiments, the document 204 and the dense image document 206 can be consistent with document 106-1 and the dense image document 106-2 of FIG. 1, respectively. As shown in FIG. 2B, the document 204 includes a plurality of words, each word including at least one character (e.g., letter). The plurality of words includes words in different sizes (e.g., the top line is larger in size than the middle line, and the middle line is larger in size than the bottom line). Furthermore, some of the plurality of words include a font attribute, namely italic. Aspects of the present disclosure can convert the document 204 to the dense image document 206 in order to more accurately identify font attributes, such as italicized letters and/or words. The dense image document 206 can be generated from the document 204 in a similar manner as described above with respect to FIG. 2A. Furthermore, the dense image document 206 is an example of a portion of a dense image document. In reality, the full dense image document 206 includes more characters in potentially different orders than the characters and/or orders shown in the dense image document 206.

Collectively, the dense image documents 202, 206 of FIGS. 2A and 2B, respectively, illustrate properties of (i) similarly sized characters (despite different sized characters in the original documents 200, 204 of FIGS. 2A and 2B, respectively), (ii) removed blank spaces (e.g., spaces separating words and line breaks separating lines of text), and (iii) altered orders of characters (where most bold or italic characters are adjacent to non-bold or non-italic characters due to the altered ordering).

Figure 3:
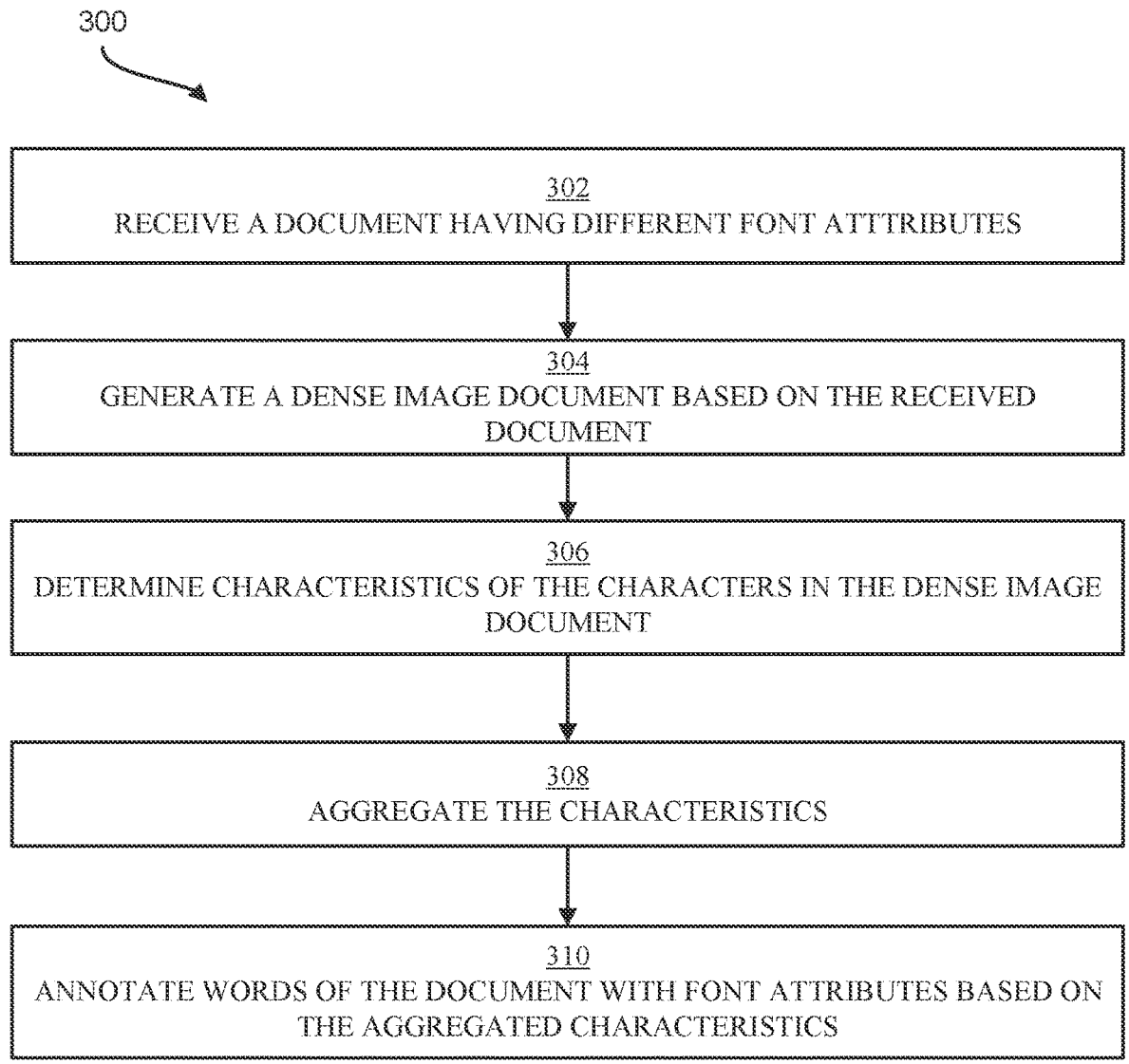
FIG. 3 illustrates a flowchart of an example method for font style detection using document-level context, in accordance with some embodiments of the present disclosure.

FIG. 3 illustrates a flowchart of an example method 300 for font style detection using document-level context, in accordance with some embodiments of the present disclosure. The method 300 can be implemented by, for example, a data processing system (e.g., data processing system 102 and/or remote data processing system 118 of FIG. 1), a server, a computer, a processor, and/or another configuration of hardware and/or software.

Operation 302 includes receiving a document 106-1 having different font attributes (e.g., a subset of font in the document 106-1 includes bold, italic, underline, and/or other font attributes). In some embodiments, operation 302 includes generating word bounding boxes 108 and/or character bounding boxes 110 from the document 106-1. Generating word bounding boxes 108 and/or character bounding boxes 110 can be performed using OCR techniques, now known or later developed. In some embodiments, generating the word bounding boxes 108 and/or the character bounding boxes 110 automatically excludes whitespaces (e.g., spacing between adjacent words, empty line breaks, etc.).

Operation 304 includes generating a dense image document 106-2 based on the document 106-1 received in operation 302. The dense image document 106-2 can transform the word bounding boxes 108 to word bounding boxes at a predefined size 112 in order to normalize a size of text in the dense image document 106-2. Furthermore, the dense image document 106-2 can transform the character bounding boxes 110 to altered character locations 114 in order to scramble character sequences in the dense image document 106-2 relative to the document 106-1. Finally, the dense image document 106-2 can remove whitespaces (e.g., spacing between adjacent words, empty line breaks, etc.) by using the word bounding boxes 108 and/or the character bounding boxes 110 to populate the dense image document 106-2, where the word bounding boxes 108 and/or the character bounding boxes 110 can automatically exclude whitespace. In some embodiments, the dense image document 106-2 results in a matrix data structure where each element of the matrix data structure is populated by a similarly sized character in an altered location relative to the document 106-1.

Operation 306 includes determining characteristics of the characters in the dense image document 106-2. Operation 306 can utilize a semantic segmentation model 116 to determine the characteristics of the characters in the dense image document 106-2 (described in more detail with respect to FIG. 4B). The semantic segmentation model 116 can generate a dense image document output 106-3 including the characteristics of the characters in the dense image document 106-2. The characteristics can include, for example, a ratio of non-white pixelated area divided by a white pixelated area (or a total area) for respective characters, a probability of a character having a certain font attribute, or other characteristics.

Operation 308 includes aggregating the characteristics of respective characters for respective words in the document 106-1. Operation 308 can include reconstituting characters into their original locations in the document 106-1 from their altered character locations 114 to enable the respective characteristics of the corresponding words to be aggregated. Aggregating characteristics can refer to any algorithm that generates a single score for the word from many scores of the corresponding characters that form the word. For example, the aggregation can sum the many scores of the corresponding characters, determine an average (e.g., mean), median, and/or mode of the many scores of the corresponding characters, or use other algorithms and/or statistics for aggregating the characteristics.

Operation 310 includes annotating words of the document 106-1 with font attributes based on the aggregated characteristics to generate an annotated document 106-4. The annotated document 106-4 can include annotations for one or multiple types of font attributes (e.g., bold, italic, underline, etc.). In some embodiments, the annotated document 106-4 can be transmitted to a computer 124 and ingested into downstream NLP software 126. Downstream NLP software 126 can produce more accurate and/or comprehensive insights using the font attribute annotations of the annotated document 106-4 than would be possible without the font attribute annotations (e.g., using the original document 106-1) or with less accurate font attribute annotations.

FIG. 4A illustrates a flowchart of an example method 400 for generating a dense image document 106-2 corresponding to a received document 106-1, in accordance with some embodiments of the present disclosure. The method 400 can be implemented by, for example, a data processing system (e.g., data processing system 102 and/or remote data processing system 118 of FIG. 1), a server, a computer, a processor, and/or another configuration of hardware and/or software. In some embodiments, the method 400 is a sub-method of operation 304 of FIG. 3.

Operation 402 includes setting the plurality of words in the document 106-1 to a predefined size. In some embodiments, operation 402 modifies each of the word bounding boxes 108 to be a similar size, such as by modifying the height to a predefined height while maintaining the original aspect ratio of each word bounding box 108.

Operation 404 includes removing blank spaces from the document 106-1. In some embodiments, operation 404 removes blanks spaces from the document 106-1 by virtue of the bounding boxes (e.g., word bounding boxes 108 and/or character bounding boxes 110) insofar as the bounding boxes automatically exclude extra whitespace. In other embodiments, operation 404 removes blank spaces using OCR techniques for detecting and removing blank spaces.

Operation 406 includes altering an order of characters in the dense image document 106-2 relative to the original document 106-1. Operation 406 can alter character locations in a random, semi-random, pseudo-random, or other technique. In some embodiments, operation 406 alters position of every character relative to its original position, whereas in other embodiments, operation 406 alters a position of a subset of characters relative to their original position.

FIG. 4B illustrates a flowchart of an example method 410 for utilizing a semantic segmentation model 116, in accordance with some embodiments of the present disclosure. The method 410 can be implemented by, for example, a data processing system (e.g., data processing system 102 and/or remote data processing system 118 of FIG. 1), a server, a computer, a processor, and/or another configuration of hardware and/or software. In some embodiments, the method 410 is a sub-method of operation 306 of FIG. 3.

Operation 412 includes generating synthetic dense image documents 122. Synthetic dense image documents 122 can be generated from a corpus of documents in a similar manner to the dense image document 106-2. However, synthetic dense image documents 122 can be used for training purposes, thus, synthetic dense image documents 122 can include accurate font attribute annotations (e.g., as annotated by, or verified by, a subject matter expert), where the accurate font attribute annotations can be used to enable the synthetic segmentation model 116 to optimize parameters for accurately annotating documents with correct font attributes.

Operation 414 includes training the semantic segmentation model 116 on the synthetic dense image documents 122. Operation 414 can utilize any of the training techniques previously described with respect to the semantic segmentation model 116 as described in FIG. 1.

Operation 416 includes inputting the dense image document 106-2 into the semantic segmentation model 116. Operation 418 includes receiving characteristics of the characters in the dense image document 106-2 as output from the semantic segmentation model 116. For example, the semantic segmentation model 116 can generate a dense image document output 106-3 including characteristics for the characters of the dense image document 106-2.

Figure 5:
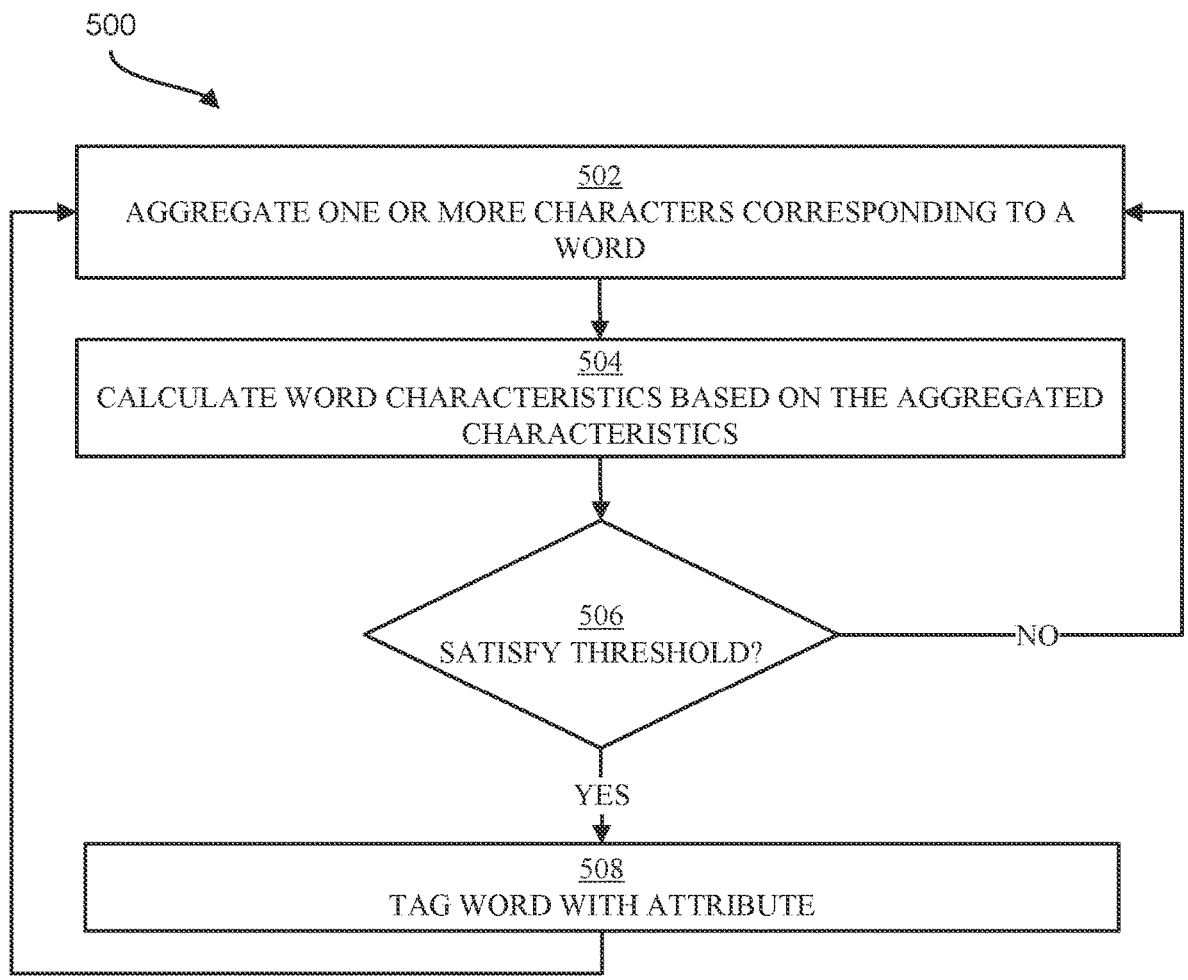
FIG. 5 illustrates a flowchart of an example method for determining a font style, in accordance with some embodiments of the present disclosure.

FIG. 5 illustrates a flowchart of an example method 500 for determining a font style, in accordance with some embodiments of the present disclosure. The method 500 can be implemented by, for example, a data processing system (e.g., data processing system 102 and/or remote data processing system 118 of FIG. 1), a server, a computer, a processor, and/or another configuration of hardware and/or software. In some embodiments, the method 500 is a sub-method of operation 308 of FIG. 3.

Operation 502 includes aggregating one or more characters corresponding to a word. In some embodiments, operation 502 involves reconstituting words from distributed characters in the dense image document 106-2. Such reconstituting can be made possible by using a correspondence table or an algorithm capable of restoring characters to an original position (in the document 106-1) from an altered position (in the dense image document 106-2).

Operation 504 includes calculating word characteristics based on the aggregated characteristics of the underlying characters. Operation 504 can sum, average, or otherwise calculate an aggregated characteristic for the word from each of the characteristics of the underlying characters.

Operation 506 includes determining if the word characteristics (e.g., the aggregated characteristics) satisfy a threshold. The threshold can be, for example, a maximum threshold (whereby word characteristics satisfy the threshold if they are less than the threshold), a minimum threshold (whereby word characteristics satisfy the threshold if they are more than the threshold), or a range of values (whereby word characteristics satisfy the threshold if they fall within the range of values). In some embodiments, the word characteristics correspond to a probability of the word having a certain attribute. In such embodiments, the threshold can be a minimum threshold reflecting the minimum probability to classify the word as having the font attribute (e.g., 0.90 corresponding to 90%). In this example, a word with aggregated characteristics of 0.93 would be determined to have the font attribute.

If so (506: YES), then the method 500 proceeds to operation 508 and tags the word with the attribute. The method 500 then returns to operation 502 and selects characters corresponding to a new word. If not (506: NO), then the method 500 does not tag the word with the attribute and returns to operation 502 and selects characters corresponding to a new word.

Figure 6:
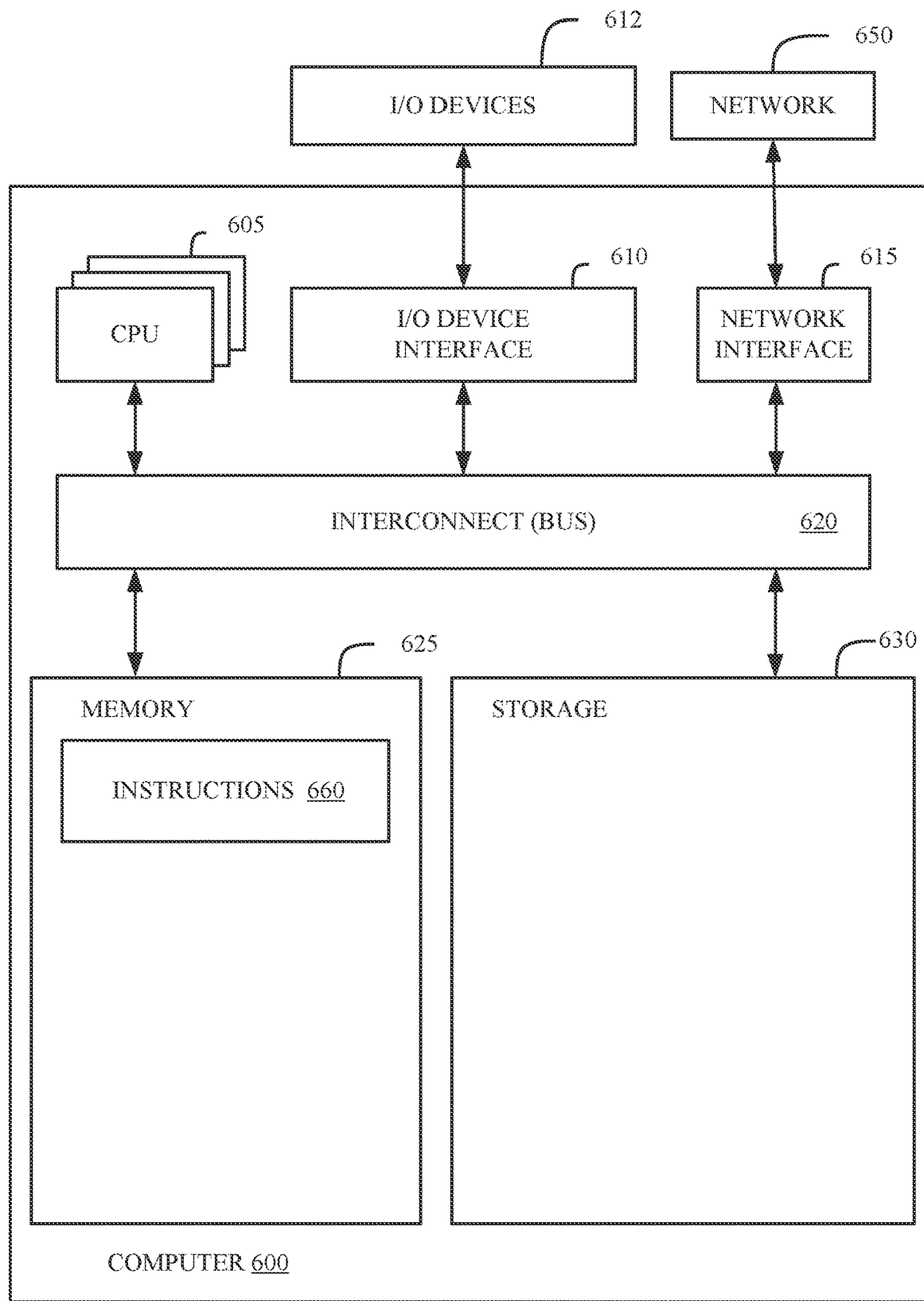
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods described in FIGS. 3-5 and/or implement the functionality discussed in FIGS. 1-2. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., data processing system 102 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), 110 device interface 610, 110 devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 3-5 and/or implement the functionality discussed in FIGS. 1-2. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
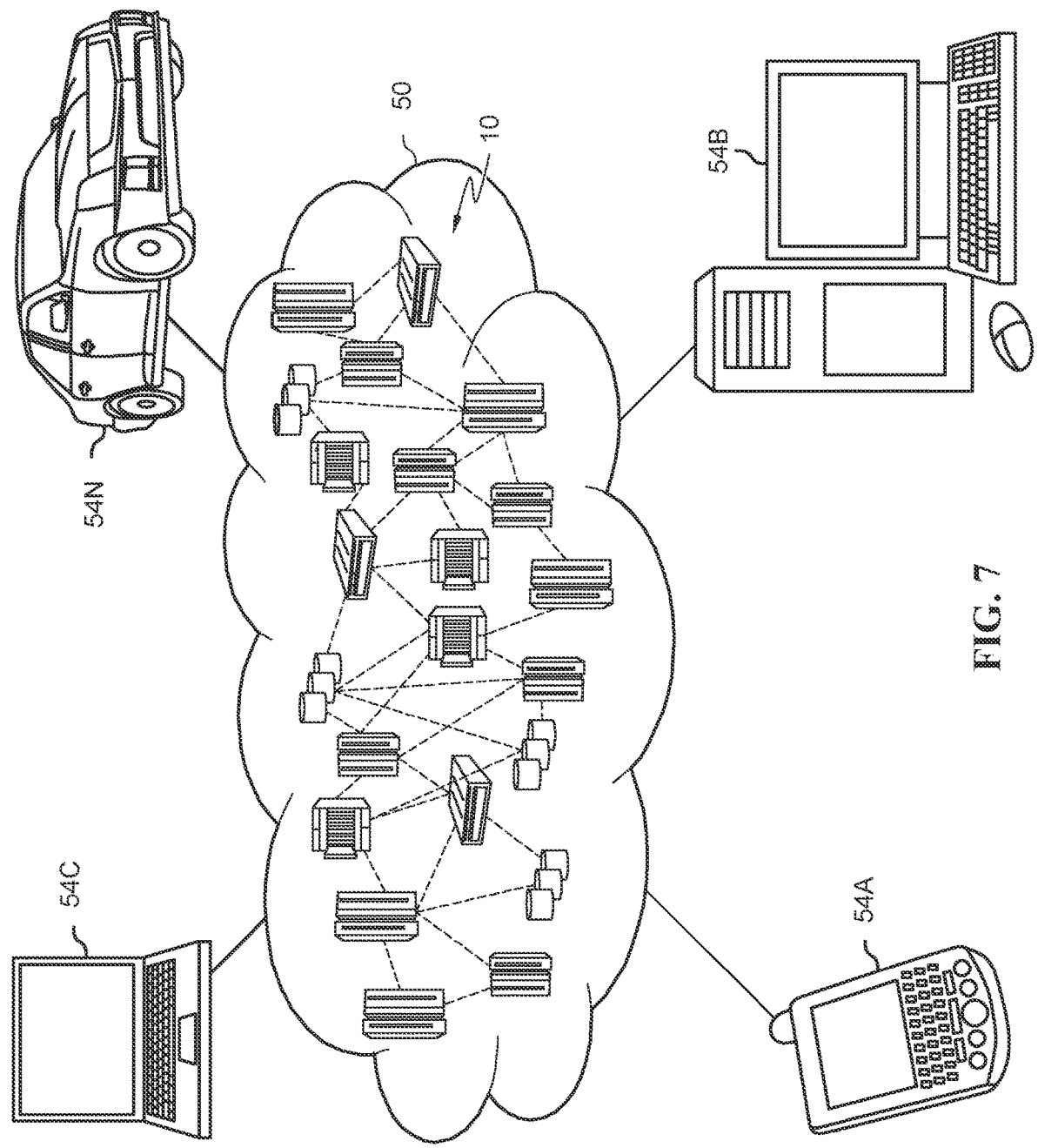
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
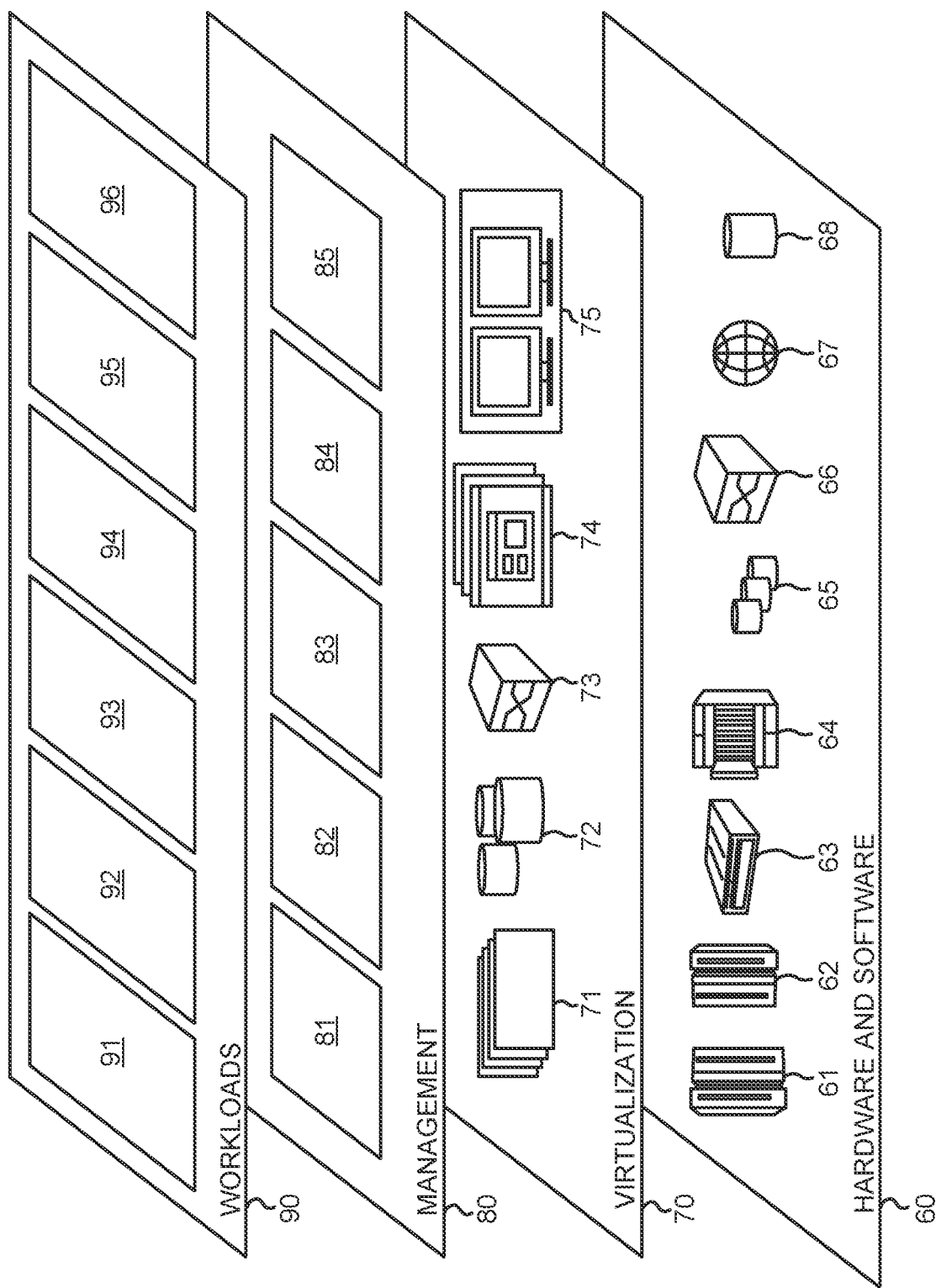
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and font attribute detection using document-level context 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 3-5 and/or implement the functionality discussed in FIGS. 1-2 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes receiving a document having different font attributes amongst a plurality of words respectively comprised of at least one character; generating a dense image document from the document by: setting the plurality of words to a predefined size; removing blank spaces from the document; and altering an order of characters relative to the document; determining characteristics of the characters in the dense image document; aggregating the characteristics for at least one word; and annotating the at least one word with a font attribute based on the aggregated characteristics.

Example 2 includes the feature of Example 1, including or excluding optional features. In this example, the different font attributes are selected from a group consisting of: bold, italic, and underline.

Example 3 includes the features of any one of Examples 1 to 2, including or excluding optional features. In this example, receiving the document further comprises: applying bounding boxes to respective words of the plurality of words in the document; and applying bounding boxes to respective characters in the respective words of the plurality of words. Optionally, this example further includes wherein setting the plurality of words to the predefined size is performed by modifying a height the plurality of words while maintaining an aspect ratio of bounding boxes corresponding to the respective words of the plurality of words Example 4 includes the features of any one of Examples 1 to 3, including or excluding optional features. In this example, altering the order of the characters within the document comprises placing the characters in a random order relative to the document.

Example 5 includes the features of any one of Examples 1 to 4, including or excluding optional features. In this example, determining the characteristics of the characters in the dense image document further comprises: inputting the dense image document to a semantic segmentation model; and receiving the characteristics of the characters as an output from the semantic segmentation model.

Example 6 includes the features of any one of Examples 1 to 5, including or excluding optional features. In this example, the characteristics of the characters comprise a ratio of pixels divided by a text area.

Example 7 includes the features of any one of Examples 1 to 6, including or excluding optional features. In this example, aggregating the characteristics for the at least one word comprises averaging the characteristics of a set of characters corresponding to the at least one word.

Example 8 includes the features of any one of Examples 1 to 7, including or excluding optional features. In this example, annotating the at least one word with the font attribute includes generating an annotated document, and wherein the method further comprises: performing natural language processing (NLP) on the annotated document.

Example 9 includes the features of any one of Examples 1 to 8, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 10 is a system. The system includes one or more computer readable storage media storing program instructions; and one or more processors which, in response to executing the program instructions, are configured to perform a method according to any one of Examples 1 to 9, including or excluding optional features.

Example 11 is a computer program product. The computer program product includes one or more computer readable storage media, and program instructions collectively stored on the one or more computer readable storage media, the program instructions comprising instructions configured to cause one or more processors to perform a method according to any one of Examples 1 to 9, including or excluding optional features.

What is claimed is:

1. A computer-implemented method comprising:
receiving a document having different font attributes amongst a plurality of words respectively comprised of at least one character;
generating a dense image document from the document by:
setting the plurality of words to a predefined size;
removing blank spaces from the document; and
altering an order of characters relative to the document by placing the characters in a random order relative to the document;

determining characteristics of the characters in the dense image document;

aggregating the characteristics for at least one word; and annotating the at least one word with a font attribute based on the aggregated characteristics.

2. The method of claim 1, wherein the different font attributes are selected from a group consisting of: bold, italic, and underline.

3. The method of claim 1, wherein receiving the document further comprises:

applying bounding boxes to respective words of the plurality of words in the document; and applying bounding boxes to respective characters in the respective words of the plurality of words.

4. The method of claim 3, wherein setting the plurality of words to the predefined size is performed by modifying a height the plurality of words while maintaining an aspect ratio of bounding boxes corresponding to the respective words of the plurality of words.

5. The method of claim 1, wherein placing the characters in the random order causes at least one character with the font attribute and in a middle of the at least one word to be adjacent to a character without the font attribute in the dense image document.

6. The method of claim 1, wherein determining the characteristics of the characters in the dense image document further comprises:

inputting the dense image document to a semantic segmentation model; and receiving the characteristics of the characters as an output from the semantic segmentation model.

7. The method of claim 1, wherein the characteristics of the characters comprise a ratio of pixels divided by a text area.

8. The method of claim 1, wherein aggregating the characteristics for the at least one word comprises averaging the characteristics of a set of characters corresponding to the at least one word.

9. The method of claim 1, wherein annotating the at least one word with the font attribute includes generating an annotated document, and wherein the method further comprises:

performing natural language processing (NLP) on the annotated document.

10. The method of claim 1, wherein the method is performed by one or more computers according to software that is downloaded to the one or more computers from a remote data processing system, and wherein the method further comprises:

metering a usage of the software; and generating an invoice based on metering the usage.

11. A system comprising:

one or more computer readable storage media storing program instructions; and one or more processors which, in response to executing the program instructions, are configured to perform a method comprising:

receiving a document having different font attributes amongst a plurality of words respectively comprised of at least one character;

generating a dense image document from the document by:

setting the plurality of words to a predefined size;

removing blank spaces from the document; and altering an order of characters relative to the document by placing the characters in a random order relative to the document;

determining characteristics of the characters in the dense image document;

aggregating the characteristics for at least one word; and annotating the at least one word with a font attribute based on the aggregated characteristics.

12. The system of claim 11, wherein the different font attributes are selected from a group consisting of: bold, italic, and underline.

13. The system of claim 11, wherein placing the characters in the random order causes at least one character with the font attribute and in a middle of the at least one word to be adjacent to a character without the font attribute in the dense image document.

14. The system of claim 11, wherein determining the characteristics of the characters in the dense image document further comprises:

inputting the dense image document to a semantic segmentation model; and receiving the characteristics of the characters as an output from the semantic segmentation model.

15. The system of claim 11, wherein the characteristics of the characters comprise a ratio of pixels divided by a text area.

16. A computer program product embodied on one or more computer readable storage media, and program instructions collectively stored on the one or more computer readable storage media, the program instructions comprising instructions configured to cause one or more processors to perform a method comprising:

receiving a document having different font attributes amongst a plurality of words respectively comprised of at least one character;

generating a dense image document from the document by:

setting the plurality of words to a predefined size;

removing blank spaces from the document; and altering an order of characters relative to the document by placing the characters in a random order relative to the document;

determining characteristics of the characters in the dense image document;

aggregating the characteristics for at least one word; and annotating the at least one word with a font attribute based on the aggregated characteristics.

17. The computer program product of claim 16, wherein the different font attributes are selected from a group consisting of: bold, italic, and underline.

18. The computer program product of claim 16, wherein placing the characters in the random order causes at least one character with the font attribute and in a middle of the at least one word to be adjacent to a character without the font attribute in the dense image document.

19. The computer program product of claim 16, wherein determining the characteristics of the characters in the dense image document further comprises:

inputting the dense image document to a semantic segmentation model; and receiving the characteristics of the characters as an output from the semantic segmentation model.

20. The computer program product of claim 16, wherein the characteristics of the characters comprise a ratio of pixels divided by a text area.

* * * * *